Figure 1:
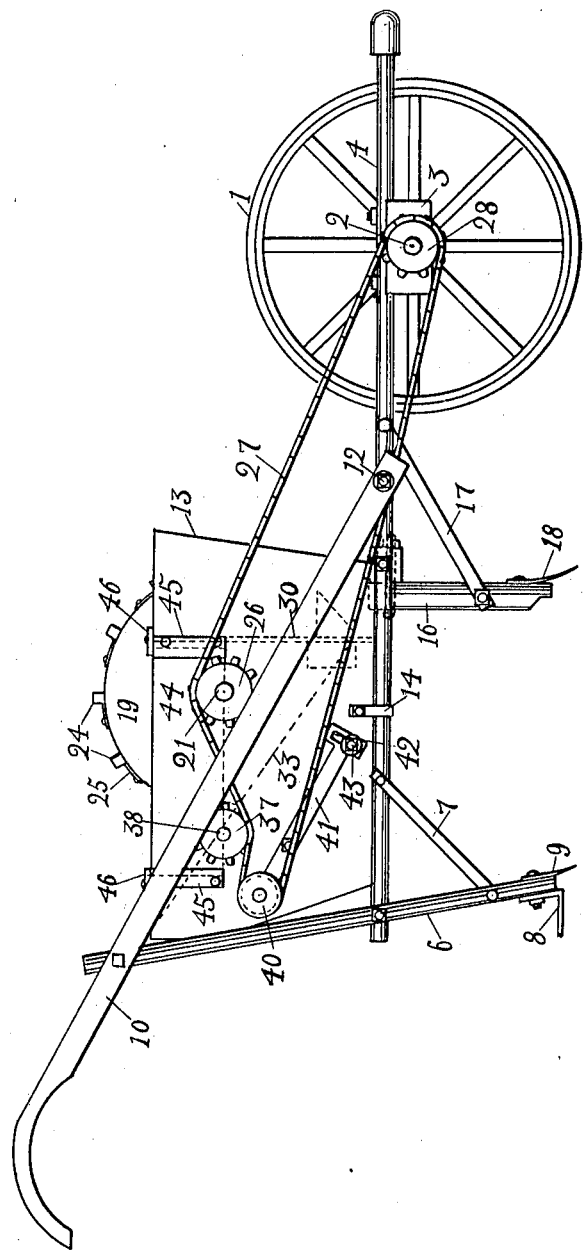

W. M. ADAMS.
SEED PLANTER.
APPLICATION FILED OCT. 19, 1911.

1,035,935.

Patented Aug. 20, 1912.
2 SHEETS—SHEET 1.

WITNESSES:
L. McDonald
Jas. T. Pomeroy, II.

INVENTOR
William M. Adams
BY John M. Spellman
ATTORNEY

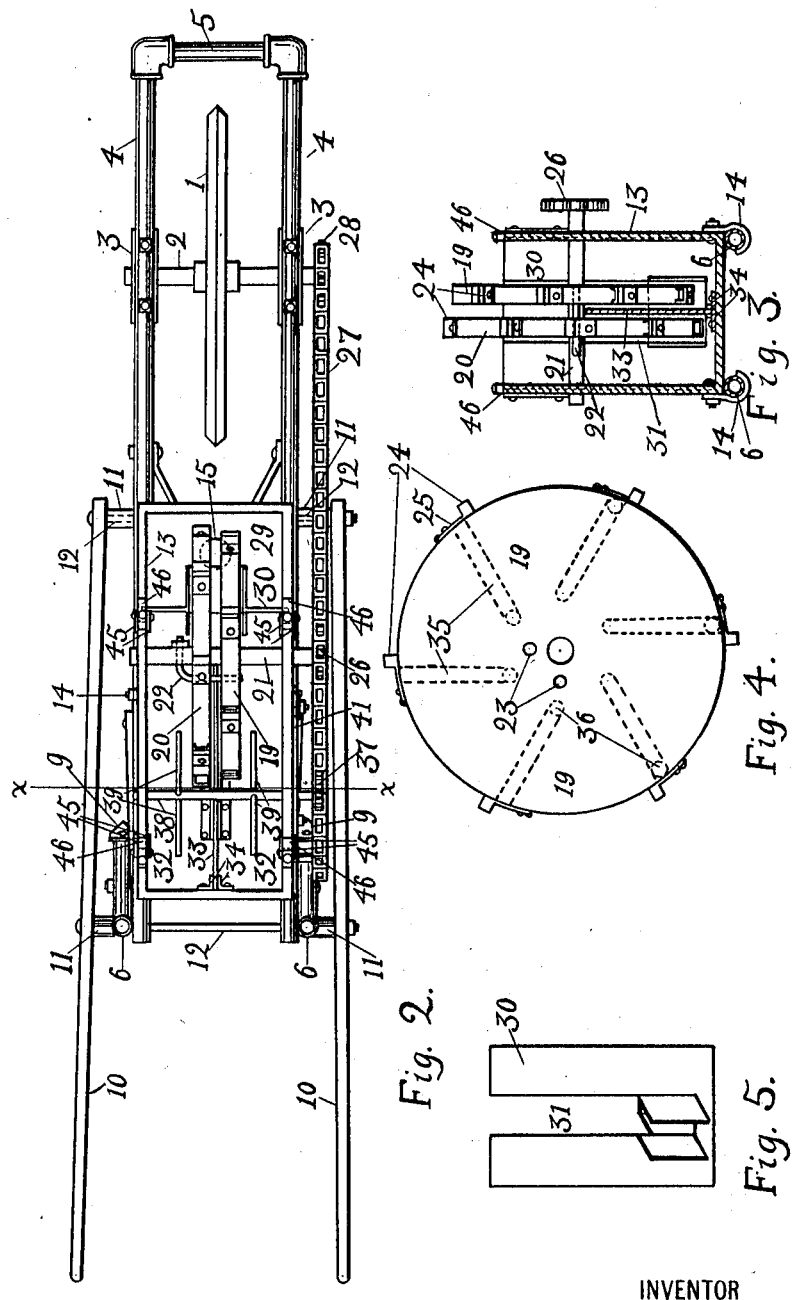

UNITED STATES PATENT OFFICE.

WILLIAM M. ADAMS, OF SABANO, TEXAS.

SEED-PLANTER.

1,035,935.  Specification of Letters Patent.  Patented Aug. 20, 1912.

Application filed October 19, 1911. Serial No. 655,609.

*To all whom it may concern:*

Be it known that I, WILLIAM M. ADAMS, a citizen of the United States, residing at Sabano, in the county of Eastland and State of Texas, have invented certain new and useful Improvements in Seed-Planters, of which the following is a specification.

My invention relates to new and useful improvements in seed planters. Its object is to provide a seed planter which will employ a novel means to accomplish a periodic discharge of the seed, said means having the nature of a rotating wheel carrying upon its rim a plurality of small equidistant cups, which cups are adapted to fill with seed while passing upward in the rear portion of the seed box, and to discharge while passing downward at the forward portion of the box.

Another object of the invention is to provide a novel mechanism by which each seed cup may be subjected to a certain shock as it reaches the bottom portion of its correlated seed wheel, thus positively forcing the seed from the cup.

A further object of the invention is to provide a seed planter that will be adapted to simultaneously plant two different kinds of seed, and which will be further adapted by slight modification to plant a considerable number of different kinds of seed.

Finally the object of the invention is to provide a device of the character described, that will be strong, durable, simple and efficient, and comparatively easy to construct, and also one the various parts of which will not be likely to get out of working order.

With these and various other objects in view, my invention has relation to certain novel features of the construction and operation, an example of which is described in the following specification and illustrated in the accompanying drawing, wherein:

Figure 1 is a side elevation of the herein-described planter, its parts being complete. Fig. 2 is a plan view of the same. Fig. 3 is a transverse vertical sectional view of the seed box and the parts immediately correlated therewith, the section being taken on the line *x—x* of Fig. 2. Fig. 4 is a detail view, showing a special form of seed wheel, which is provided with a plurality of equidistant tubular apertures extending from the rim to the central portion of the wheel, each of said apertures containing a ball adapted to move freely in the aperture, and each aperture discharging beneath a seed cup secured to the rim of the wheel. Fig. 5 is a detail isometric view of a special form of partition, which is transversely mounted in the front portion of the seed box, a compartment being formed at the front of said partition, from which the seed are discharged.

Referring now more particularly to the drawings, wherein like numerals of reference designate similar parts in all the figures, the numeral 1 denotes a transporting wheel, fast upon the central portion of a short axle member 2, having its extremities journaled in a pair of bearings 3. These bearings are mounted beneath the forward portions of two parallel beams 4, which together with a short transverse member 5 connecting the front extremities of said beams, forms an elongated U-shaped frame, normally horizontal. A pair of parallel bars 6, inclined slightly forward from their upper to their lower extremities, are bolted or otherwise secured to the rear ends of the beams 4. The portions of these bars which extend below the beams 4 form legs to uphold the rear end of the planter, and are made rigid with the frame of the planter by a pair of diagonal braces 7, extending forwardly and upwardly to the beams 4. The lower extremities of the members or bars 6 are provided with feet 8 formed by a pair of angle-irons, each having one member extending rearwardly. The lower ends of the bars 6 also carry a pair of small plows or shovels 9, mounted transversely with relation to the direction of travel of the planter. When the planter is in motion, the plows 9 will extend slightly beneath the surface of the ground while the feet 8 slide upon said surface. A pair of inclined handle members 10 have their forward extremities bolted to the middle portions of the beams 4, and their rear portions bolted to the upper extremities of the bars 6 which bars project above said beams. The two handle members are spaced outwardly from the members 4 by collars 11, carried by the bolts 12, attaching said members 4 and 6 to the handle members. The rear extremities of the handle members are curved downwardly and rounded to form grips.

A seed box 13 is mounted upon the rear portion of the frame resting upon the beams 4 and attached to the same by a pair of hooks 14, oppositely secured to the sides of the box and partially encircling said beams. A discharge aperture 15 is provided in the bottom of the seed box at the front extremity thereof, which aperture communicates with a cylindrical seed chute 16, terminating adjacent to the ground. The seed chute is held rigid in its proper position by a pair of inclined braces 17, having their lower extremities oppositely attached to the middle portion of the chute and their upper or forward ends respectively secured to the beams 4. A plow 18 is mounted upon the lower end of the seed chute, serving to open a furrow to receive the seed.
Within the seed-box, a pair of seed-wheels 19 and 20, equal in diameter, are mounted upon a transverse shaft 21, having its extremities journaled in the side walls of the box. The shaft 21 is so positioned that the peripheries of the two wheels are closely adjacent to the front wall and bottom of the seed-box, but spaced some distance from the rear wall of the box. A pin 22, fixed in the shaft 21 adjacent to the two wheels, is bent at a right angle, adapting it to pass through any one of a plurality of small apertures 23 provided in said wheels adjacent to the central apertures thereof, thus making the two wheels rigid with the shaft.
Upon the rim of each wheel are equidistantly mounted a plurality of seed cups 24 having their bottoms perpendicular to the wheel rims, each cup being mounted upon one extremity of a short shank 25, contiguous with the correlated rim and having its other end secured thereto. The shaft 21 carries upon one extremity a sprocket wheel 26, to which rotation may be communicated through a chain 27 from a sprocket wheel 28 fast upon one extremity of the axle 2. A compartment 29 containing the aperture 15 is formed in the front portion of the seed-box by a transverse vertical partition 30 provided with a downwardly extending central slot 31, into which the two seed-wheels may project. The partition 30 is adapted to be vertically displaced, being slidably mounted in a pair of grooves oppositely provided upon the side walls of the box. The rear portion of the box is divided into two compartments 32 by a vertical partition 33, parallel with the side walls and extending between the two seed-wheels. The partition 33 is removable, being slidable in guides 34, a pair of which are provided upon the bottom and the rear wall of the seed box. The rear compartments 32 form bins to receive two different varieties of seed. As the rear portions of the two seed wheels move upwardly through said bins, the cups 24 will each scoop up a small number of seed which will be deposited in the compartment 29 as the cups are inverted during their downward travel through said compartment. The floor of the compartment 29 is so shaped as to immediately discharge the seed through the aperture 15 into the seed chute.

In planting cotton seed, the lint adhering to the seed may tend to cause them to pack in the cups of the seed-wheel, so as to prevent their discharge when the cups are inverted. To eliminate this possibility, the seed-wheel used in planting cotton (illustrated in Fig. 4) is provided with a plurality of tubular apertures 35 extending from the middle portion of the wheel to the rim thereof and each opening beneath one of the seed-cups. Within each aperture 35 is mounted a small ball 36 preferably of steel, which balls are free to roll back and forth within their respective apertures. As each cup upon the wheel approaches its lowest position during the operation of the planter, the ball 36 in the aperture closed by said cup will drop, due to the action of gravity thus subjecting the cup to a sudden jar that will immediately dislodge the seed therefrom. As the cup is again moving upward through one of the compartments 33, the ball 36 will roll back to the middle portion of the wheel, thus being adapted to fall again as the cup moves down.

The chain 27 after passing over the sprocket wheel 26 is made to engage the under portion of a sprocket wheel 37 fast upon one extremity of a spindle 38 transversely mounted in the side walls of the seed box just at the rear of the wheels 19 and 20. The spindle 38 carries two sets of radial arms 39, one set being located within each compartment 32. The parts 38 and 39 form an agitator serving to stir the seed in the compartments 32, preventing the same from packing, and thus interfering with the rotation of the seed-wheels. The rear end of the chain 27 is looped over an idler pulley 40 mounted upon the rear extremity of a bar 41, pivoted near its middle upon the side wall of the seed-box. The bar 41 is inclined slightly downward from its rear to its forward extremity, the latter extremity being provided with a transverse groove 42. A pin 43 projecting rigidly from the seed-box passes through the groove 42 and is provided upon its threaded outer extremity with a nut by which the bar may be clamped against the seed-box to prevent motion about its pivotal center. The parts 40 and 41, thus arranged constitute a device for taking up the slack in the chain 27, the pulley 40 being adjustable in position, so as to permit the chain to run either loose or tight.

The size of the cups 24 carried by the seed-wheel and the distance between these cups will be varied according to the seed to be planted. The cups employed for planting peanuts will be comparatively large. Those for corn and cotton will be considerably smaller and those for planting peas still smaller. The seed planter therefore will be provided with a number of seed-wheels differing from each other in the size and spacing of the seed-cups. In case it is desired to plant only one kind of seed, the partition 33 will be removed and only one wheel will be mounted upon the shaft 21.

In order to facilitate the substitution of one seed-wheel for another, the seed-box is so constructed that the shaft 21 may be readily removed. To secure this result, the upper middle portions of the side walls of the seed-box are made removable, the removable portions being designated by the numeral 44. The journal apertures which receive the extremities of the shafts 21 and 38 are located at the junctures of the removable portions 44 with the stationary portions of the side walls, so that the two shafts may be readily removed after the portions 44 have been raised. The portions 44 are slidable between guide members 45 arranged in pairs, and upward displacement of said portions is normally prevented by blocks 46 pivoted upon the top edges of the box, and adapted to project over the portions 44.

From the above description, the manner in which the planter operates is apparent.

By providing the seed-wheels 19 and 20 with two or more apertures, it is made possible to readily subject either wheel to angular adjustment, so as to regulate the positions of the cups on one wheel relative to those on the other.

It is apparent that various changes may be made in the form and proportion of parts and details of the above described invention without departing from the spirit or sacrificing the advantages thereof, and the invention is therefore presented as including all changes and modifications that come within the scope of the following claim.

What I claim is:

A seed wheel for planters comprising a solid circular body, having a plurality of equi-distant tubular apertures extending from the rim to the middle portion of the wheel, a ball free to move in each of said apertures, a plurality of feed cups mounted upon the wheel rim, one over each aperture, said cups being so supported that they may undergo a slight radial displacement.

In testimony whereof I have signed my name to this specification in the presence of two subscribing witnesses.

WILLIAM M. ADAMS.

Witnesses:
EARLE SHELL,
R. O. WOZENCROFT.

Copies of this patent may be obtained for five cents each, by addressing the "Commissioner of Patents, Washington, D. C."